United States Patent
Ziegler

(10) Patent No.: US 7,353,937 B2
(45) Date of Patent: Apr. 8, 2008

(54) METHOD OF MONITORING BELT ORIENTATION AND/OR BELT TRAVEL OF A BAND BELT CONVEYOR APPARATUS AND A BAND BELT CONVEYOR

(75) Inventor: Manfred Ziegler, Erfstadt (DE)

(73) Assignee: RWE Power Aktiengesellschaft, Essen (DE)

( * ) Notice: Subject to any disclaimer, the term of this patent is extended or adjusted under 35 U.S.C. 154(b) by 28 days.

(21) Appl. No.: 11/381,833

(22) Filed: May 5, 2006

(65) Prior Publication Data

US 2006/0254885 A1 Nov. 16, 2006

(30) Foreign Application Priority Data

May 6, 2005 (DE) .................... 10 2005 021 627

(51) Int. Cl.
*B65G 43/00* (2006.01)
(52) U.S. Cl. .................. 198/810.03; 198/810.04
(58) Field of Classification Search ........... 198/810.01, 198/810.02, 810.03, 810.04
See application file for complete search history.

(56) References Cited

U.S. PATENT DOCUMENTS

| | | | | |
|---|---|---|---|---|
| 5,784,676 A | * | 7/1998 | Iseki et al. ................ | 399/301 |
| 6,047,814 A | * | 4/2000 | Alles et al. .............. | 198/810.02 |
| 6,088,559 A | * | 7/2000 | Costanza et al. .......... | 399/165 |
| 6,291,991 B1 | * | 9/2001 | Schnell ....................... | 324/235 |
| 6,352,149 B1 | * | 3/2002 | Gartland ................ | 198/810.02 |
| 6,568,280 B1 | * | 5/2003 | Park et al. .................... | 73/828 |
| 6,581,755 B1 | * | 6/2003 | Wilke et al. ........... | 198/810.03 |
| 6,585,108 B2 | * | 7/2003 | Travis ................... | 198/810.02 |
| 6,600,507 B2 | * | 7/2003 | Sanchez et al. ............. | 347/262 |
| 6,644,465 B1 | * | 11/2003 | Dube .................... | 198/810.03 |
| 6,712,199 B1 | * | 3/2004 | Bruckner et al. ...... | 198/810.03 |
| 7,017,799 B2 | * | 3/2006 | Schwandner ................ | 235/375 |
| 7,032,740 B2 | * | 4/2006 | Hochhaus et al. ....... | 198/502.1 |

FOREIGN PATENT DOCUMENTS

| | | |
|---|---|---|
| DE | 197 13 560 | 12/1998 |
| DE | 19911640 | 9/2000 |
| DE | 19911642 | 9/2000 |
| DE | 10003308 | 8/2001 |
| DE | 103 17 569 | 11/2003 |

\* cited by examiner

*Primary Examiner*—Douglas A Hess
(74) *Attorney, Agent, or Firm*—Grossman Tucker Perreault & Pfleger, PLLC

(57) ABSTRACT

A method of monitoring belt orientation and/or belt travel of a belt conveyor apparatus includes measurement of compression and/or thrust stress patterns within the belt as it passes over a support roller arrangement by measuring means embedded in the belt. The measured signal is recorded and associated with a specific support roller. The signal pattern allows conclusions to be drawn about misalignments of the belt or possible defects in the support rollers. A belt conveyor apparatus has measuring means embedded in the belt and including at least one multi-axis sensor for detecting the stress variations in the belt.

14 Claims, 2 Drawing Sheets

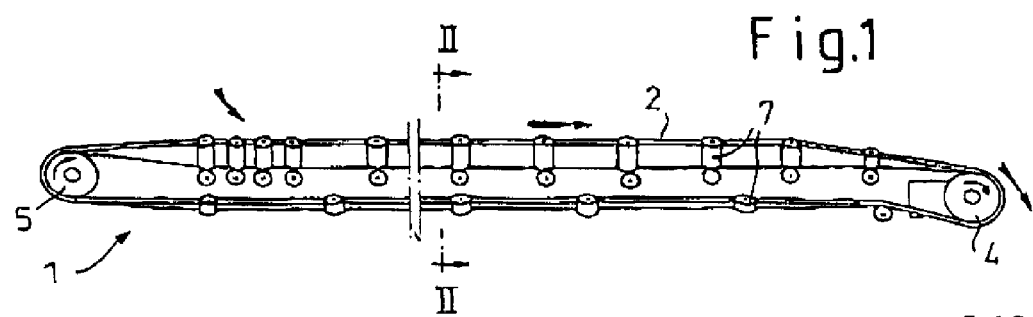
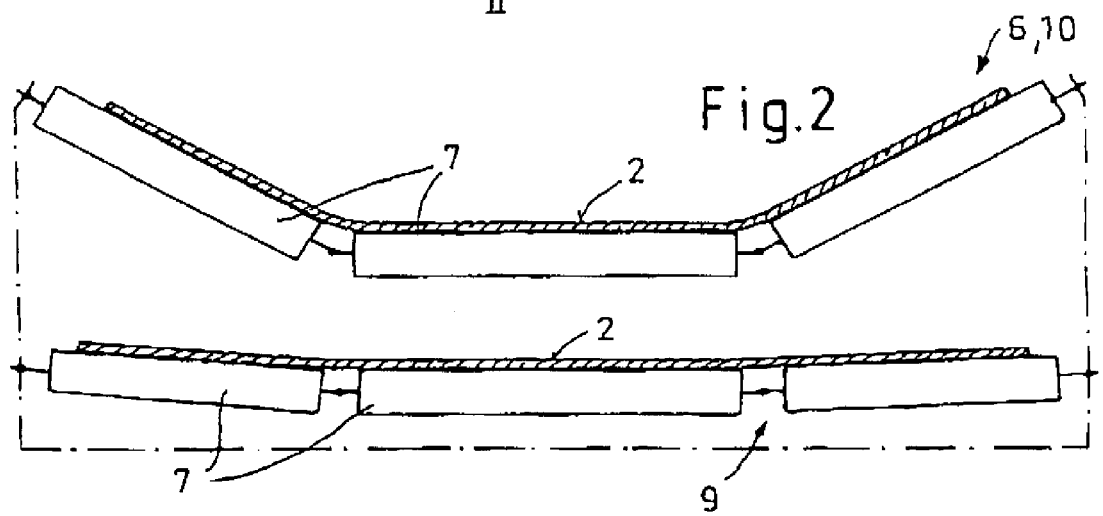
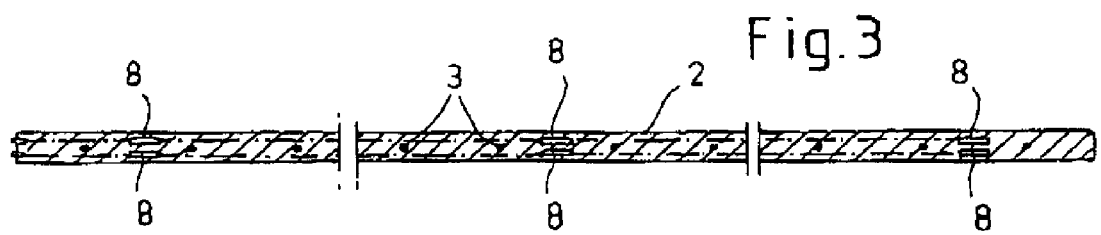

METHOD OF MONITORING BELT ORIENTATION AND/OR BELT TRAVEL OF A BAND BELT CONVEYOR APPARATUS AND A BAND BELT CONVEYOR

CROSS-REFERENCES TO RELATED APPLICATIONS

This application claims the priority of German patent application Serial No 10 2005 021 627.7 filed May 6, 2005, the subject-matter of which is incorporated herein by reference.

FIELD OF THE INVENTION

The invention concerns a method of monitoring belt orientation and/or belt travel of a band belt conveyor apparatus.

The invention further concerns a band belt conveyor for bulk material.

It will be noted here that the reference to belt travel in accordance with the present invention is used to include in particular also the detection of defective support rollers within the belt conveyor apparatus.

BACKGROUND OF THE INVENTION

A fairly typical form of band belt conveyor apparatus using for example a webbing belt or a rubber belt or a belt of like material includes at least one flexible band belt such as of webbing or rubber material which circulates endlessly between reversal stations and/or drive stations. The belt forms a load run and an idle run, with the belt being supported on support rollers at least in part between the above-indicated stations.

Band belt conveyor apparatuses of the above-indicated type are frequently used as bulk material conveyors in mining operations, for example in open cast mining works. The materials to be transported are conveyed on an endlessly circulating belt. The required pulling force to drive the belt is applied thereto in force-locking relationship at at least one of the reversal points or reversal stations of the belt. The belt is supported over support rollers between the reversal points or reversal stations. A distinction is frequently drawn between stationary belt installations and movable belt installations. Movable belt installations are frequently used for example in open cast mining operations in which the conveyor installations must advance with the progress of the mining location.

Problems with and troubles on band belts are primarily to be attributed to defective support rollers or support frame structures which are improperly oriented. Improperly oriented support structures cause the belt to run inclinedly in an off-track condition or give rise to overloading at individual belt support rollers. Bearing damage at the bearings of the belt support rollers are frequently the cause of problems and difficulties in that respect. That gives rise to an increased level of heat generation which in the worst-case scenario can lead to an open fire. Defective or damaged support rollers frequently make themselves noticed by virtue of elevated levels of sound emission or indeed only by the production of noise or by virtue of fire.

DE 10003308 A1 discloses a method and an apparatus for detecting and locating noise sources on conveyor belts, in particular on belt sections in open cast mining operations. The method is carried out by means of a mobile measuring device which is not fixedly linked to the conveyor belt and which is used while moving in approximately parallel relationship at a conveyor belt to detect the sound level emitted by the individual rollers and/or garland sections of the conveyor belt. The sound level which is continuously detected at least in portion-wise manner in relation to the belt during the advance movement is divided into a number of n-sound spectra and given sound spectra are associated with specific rollers or garland portions of the belt by means of a locating or positional signal which is recorded in parallel with the detected sound level.

Although that operating procedure has proven to be worthwhile nonetheless it relatively frequently happens that support rollers which are in a good condition are picked out for removal or replacement because the procedure does not provide absolute accuracy in terms of locating the support rollers. It can also be easily imagined that it is a comparatively arduous task to cover what may involve hundreds of kilometers on belt lines in that way.

Finally the orientation condition of belt installations is also an aspect of crucial significance in terms of energy consumption and trouble-free operation. If support roller frame structures are properly oriented it is possible to achieve a comparatively centrally aligned belt travel. If the quality of alignment is somewhat worse however it is no longer possible to guarantee that the belt travels in a central position but it is not possible to detect that improper orientation of the belt by way of the procedure involving detecting sound emission.

DE 199 11 642 A1 discloses a method of and an apparatus for diagnosing the damage condition of support rollers in band belt conveyors of a typical configuration as referred to hereinbefore, wherein thrust or transverse stress measuring sensors for central rollers and travel measuring sensors are arranged at the surface of or in the interior of the conveyor belt. The measurement values produced by the thrust or transverse stress measuring sensors for central rollers and the travel measuring sensors when the conveyor belt passes in an empty or loaded condition over the support rollers are used to calculate the peripheral force of the support rollers. That force is recorded, subjected to preliminary processing, put into intermediate storage and read out when passing an interrogation unit.

That operating procedure requires a separate travel measuring system to be integrated into the sensor arrangement. Furthermore calibration of the system is required, by way of a single load. In addition, the respective current weight of material being conveyed has to be ascertained using a volume or density scanner or a belt weighing arrangement.

DE 199 11 640 A1 discloses arranging pressure measuring sensors and travel measuring sensors at the surface of a conveyor belt or in the interior thereof. The measurement values from those sensors, when the empty conveyor belt passes over the support rollers of the assembly, are used to register any installation faults or defects in the support roller station at the upper run of the belt, so that such faults or defects can then be calculated. In addition pressure measuring sensors are arranged laterally of the conveyor belt and acceleration measuring sensors are arranged on the material side of the conveyor belt in such a way that on the basis of the measurement values thereof any installation faults or defects in respect of the support roller stations can be registered, calculated, stored and items of information can be produced therefrom relating to their condition and the need for repair or maintenance. It will be noted however that that method is also comparatively complicated and expensive.

SUMMARY OF THE INVENTION

An object of the present invention is to provide a method by which belt orientation and/or belt travel of a band belt conveyor apparatus can be monitored inexpensively using comparatively simple means.

Another object of the present invention is to provide a method of monitoring at least one of belt orientation and belt travel of a belt conveyor apparatus, which can provide adequately reliable and accurate measurement results without involving highly complex measuring and sensing systems.

Yet another object of the present invention is to provide a band belt conveyor apparatus for bulk material which has means of comparatively simple nature for monitoring correct setup and operation of the apparatus.

In accordance with the principles of the present invention in the method aspect the foregoing and other objects are attained by a method of monitoring belt orientation and/or belt travel of a belt conveyor apparatus, including the step of measuring the compression and/or thrust or transverse stress variation within the band belt when passing over a support roller arrangement. The measured signal is recorded and the signal is associated with a given support roller arrangement. The signal which is provided with that positional association is displayed for the purposes of detecting incorrect orientation or misalignment of the belt or faults or defects at the one or more support rollers in question. The association of a given measurement signal with a given support roller arrangement is effected with calculation of the number and the time spacings of characteristic measurement signals relative to each other having regard to the speed of the belt, measurement and recording of the signal being effected without the assistance of travel measuring sensors.

As will be seen from the description hereinafter of preferred embodiments of the invention, the method according to the invention is based on the realisation that, when the band belt passes over a support roller arrangement, a typical pressure and/or thrust or transverse stress variation is generated within the belt. That variation can be detected by means of a sensor and evaluated. If a support roller is damaged or defective because of a bearing defect or if a support roller within an arrangement of a plurality of support rollers is loaded to a greater or lesser degree by virtue of incorrect orientation or misalignment of the belt, a signal which differs from the typical pressure and/or thrust or transverse stress pattern is produced, and on the basis thereof it is possible to locate the problem location within the belt assembly.

As the garland portions of the belt or the support roller stations of the belt conveyor apparatus are at fixed spacings relative to each other and the passage of the belt around a drum or a reversal station produces a markedly different signal, the position of the support rollers can be determined by simply counting off the signals of the support rollers, from the signal of a reversal station or a drive station. For example, in the case of a belt installation operating at a belt speed of 7.5 m/s and with a garland portion spacing or support roller spacing of 1.875 m, a pressure or thrust or transverse stress signal is to be expected every 0.25 s. The absence of the signal or a departure from a typical signal configuration indicates a fault or problem. If the signal fails to appear it is probable that the belt is no longer in contact with the support roller or that the support roller is missing. In the case of a differing signal configuration, the possibility is that the support roller is excessively loaded or is suffering from bearing damage. The fact that the belt is running off-track or inclinedly for example is indicated by a successive increase in the applied load at one side of the belt installation, at the expense of the other side.

In accordance with a preferred feature of the invention, the quantitative variation in a thrust stress signal measured in the belt is recorded in relation to the variation in respect of time of the signal when passing over a support roller arrangement. The recorded signal which is provided with positional identification is used to assess the belt travel and/or belt orientation at the location in question.

In another preferred feature, measurement of the thrust stress is effected in first and second mutually perpendicular axes, preferably for example in the direction of the belt travel and transversely with respect to the direction of belt travel, for example by means of multi-axis force sensors or thrust stress sensors. Comparison of the lengthwise and transverse force components within the belt with the loading on the belt makes it possible to ascertain the static friction between the belt and the support roller, and thus information about the tendency for the belt to run off-track or inclinedly can be derived therefrom. A drop in the coefficient of friction at one side of the belt leads to the belt running off-track or inclinedly. In the case for example of a conveyor belt apparatus operating in the open air, as in open cast mining, such a one-sided drop in the coefficient of friction could be caused for example by heavy rain or a rain storm or by the arrangement being sprayed with water. Taking account of all lengthwise and transverse forces at all support rollers in the circulatory path makes it possible to obtain information about the current risk of off-track or inclined running of the belt and affords the possibility of implementing countermeasures. It is possible for example to envisage spraying water on the side of the belt to which the belt is running off-track, in a deliberate and specifically targeted fashion to remedy the problem.

Another preferred feature of the invention provides that the detected measurement values can be stored for example in an intermediate storage means and cyclically read out or outputted.

In a further preferred feature the detected measurement values are contactlessly read out, for example the detected measurement values can be transmitted by radio to an evaluation station.

Further in accordance with the invention in the apparatus aspect the foregoing and other objects are attained by a band belt conveyor for bulk material comprising at least one flexible band belt which in operation passes continuously between reversal stations and/or drive stations. The belt forms a load run and an idle run. The belt is at least partially supported on support rollers between the stations. The belt has at least one measuring means for detecting compression and/or thrust or transverse stresses, as well as means for outputting and/or storing the detected measurement values. The measuring means is embedded in the belt. The measuring means includes at least one multi-axis compression and/or thrust stress sensor.

As will be seen from the description hereinafter of a preferred embodiment, that structure provides that the entire belt conveyor apparatus can be monitored over the length of an endlessly circulating belt by means of a minimum number of measuring devices, without the need for that purpose to provide measuring devices at individual rollers or at individual support roller frame structures.

If the belt comprises rubber-elastic material with tensile carriers which are incorporated therein, for example by vulcanisation, a preferred feature of the invention provides that at least one measuring means is vulcanised into the belt band.

In another preferred feature of the invention, on both sides of the tensile carriers disposed in the belt a respective plurality of measuring means arranged in distributed relationship in accordance with the number of support rollers per support roller station over the width of the belt is embedded in the belt so that a respective measurement signal can be produced when the belt passes over each of the mutually juxtaposed support rollers, both for the upper run and also for the lower run of the belt, for each of the support rollers. In that way information can also be supplied about the belt orientation by a comparison of the measurement signals from respective mutually juxtaposed support rollers, in transverse relationship with the direction of conveying movement.

In a further preferred feature the measuring means includes means for evaluation and/or storage of the measurement values. The means for outputting measurement values which have possibly already been evaluated can be for example at least one transmitter and/or at least one transponder. The transmitter and/or transponder can be embedded in the belt. The evaluated measurement values can be transmitted over a radio path to a station by means of a transmitter.

In an alternative configuration it is possible to provide an intermediate storage means having an interface in the form of a plug connection which is accessible from the exterior. After one or more revolutions of the belt the measurement values stored in the intermediate storage means can then be read out and evaluated.

In the operation of recording the measurement signal, an identification which is specific to each support roller, for example in the form of a numerical code, can be produced by suitable calculation. The identifications of all support rollers can be read out and evaluated for example at suitable spacings. The measurement means can each include a respective calculating unit and a storage unit.

Further objects, features and advantages of the present invention will be apparent from the description hereinafter of preferred embodiments.

BRIEF DESCRIPTION OF THE DRAWING

FIG. 1 is a diagrammatic view of the belt conveyor in accordance with the invention, FIG. 2 is a view in section taken along line II-II in FIG. 1, FIG. 3 is a view in section through the belt of the FIG. 1 assembly.

DESCRIPTION OF THE PREFERRED EMBODIMENT

Figure 4:
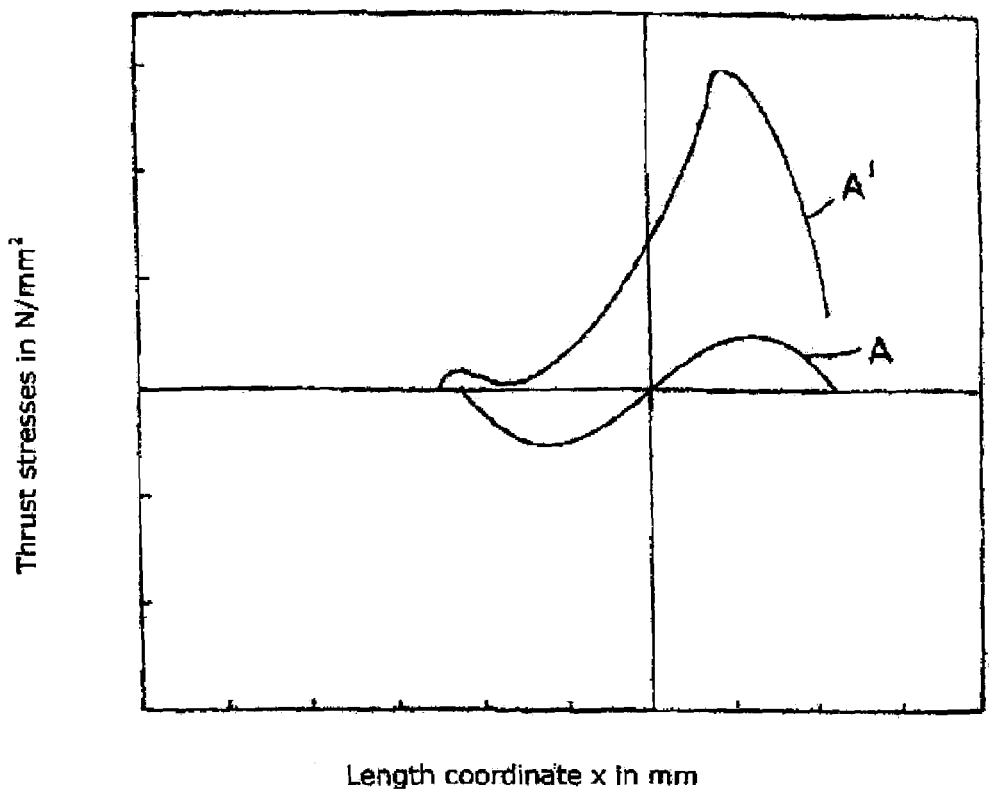
FIG. 4 is a graphic representation of the typical thrust stress variation in a belt when passing over a support roller, the typical said variation in the belt being recorded when passing over an intact support roller and when passing over a defective support roller.

Referring firstly to FIG. 1 shown therein in diagrammatically simplified form is a typical band belt conveyor 1 comprising an endlessly circulating band belt 2 of rubber-elastic material with tensile carriers in the form of steel cables or wires 3 which are vulcanised therein, a drive station including a drive drum 4 and a rear station comprising a rear drum 5. Reference numeral 6 denotes support roller frame structures which are arranged between the drive drum 4 and the rear drum 5 and which include support rollers 7 on which the belt 2 is supported at spaced intervals between the drums 4 and 5. It will be appreciated that instead of support roller frame structures 6 it is also possible to provide support roller garland portions. It will be appreciated that belt tensioning devices and belt slide members are not illustrated here for reasons of simplification of the drawing. It will thus be fully appreciated that the belt conveyor 1 shown in FIG. 1 is only illustrated in a highly simplified form.

To carry out the method according to the invention and looking now at FIG. 3, three measuring devices 8 are vulcanised into the belt 2 on respective sides of the steel cables 3 serving as the tensile carriers. The measuring devices 8 diagrammatically shown in FIG. 3 above the steel wires or cables 3, as viewed over the width of the belt 2, are each associated with a respective support roller 7 in the idle or lower run of the conveyor belt 2. The measuring devices 8 arranged in FIG. 3 beneath the steel wires or cables 3 are each associated with a respective support roller 7 in the load or upper run of the belt. Separate measuring devices 8 are provided for the load run 10 and the idle run 9 for the reason that the steel wires or cables 3 tend to prevent unimpeded propagation of the thrust stress signal within the belt 2. In the simplest case each measuring device 8 includes a sensor which can be in the form of a single-axis or multi-axis compression and/or thrust stress sensor. It can additionally be provided that each sensor is temperature-sensitive or an additional temperature sensor can be provided in order for example to be able to detect a support roller 7 which is running hot, by way of the heat dissipated therefrom.

The illustrated embodiment provides that the measuring devices 8 each include thrust or transverse stress sensors. In addition the measuring devices 8 include at least one logic evaluation means, for example in the form of an analog calculating assembly and a data storage means. A total of six measuring devices 8 are provided over the entire circulating length of the belt 2, three for the load run 10 and three for the idle run 9. In FIG. 3 the measuring devices 8 for the load run 10 and the idle run 9 are shown in the same sectional plane but it will be appreciated that they can equally well be arranged at different locations in the longitudinal direction of the belt 2.

When the measuring devices 8 embedded in the belt 2 pass over a support roller arrangement comprising for example three support rollers 7, a typical thrust stress signal is produced for each support roller 7, being identified for example by A in FIG. 4. The signal for each support roller is provided in the calculating unit disposed in the measuring device 8 with an identification which permits positional association, for example in the form of an item of spacing information with respect to the drive drum 4 or the rear drum 5. That identification is stored in the storage means. A given number of measurement signals provided with their respective identification can be stored over a given number of revolutions of the measuring devices 8 in the course of the circulatory movement of the belt 2. Then, after the belt conveyor apparatus 1 is stationary, the data are read out by way of a suitable interface for example in the form of a plug connection (not shown) and displayed and/or evaluated in order to assess the belt travel or the operating state of individual support rollers.

Alternatively, transmitters and/or transponders can be associated with the respective measuring devices 8, by means of which the recorded measurement values can be continuously transmitted to a remotely arranged station for suitable processing thereof.

The advantage of arranging the measuring devices 8 within the belt 2 in which they are embedded will be apparent. A comparatively small number of measuring devices 8 is required for the purpose of monitoring many kilometers of a belt conveyor apparatus. Possible faults or problems can be located comparatively accurately and in close to real time without inspecting the belt conveyor apparatus 1 on foot or by travelling along it.

Figure 5:
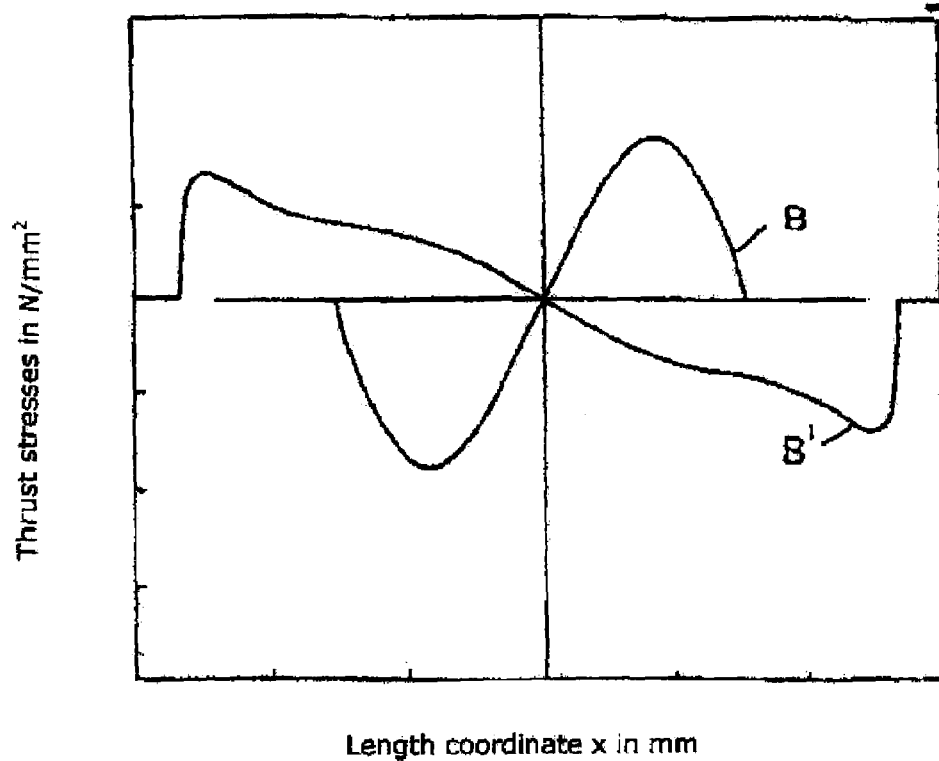
FIG. 5 is a graphic illustration corresponding to FIG. 4 of the thrust stress variation in a belt, illustrating differing heightwise orientations of garland portions of the belt or support roller frame structures which are disposed in succession in the direction of conveying movement of the belt.

Reference will now be made to FIGS. 4 and 5 showing typical thrust stress patterns whenever a measuring device or the respective sensor passes over a support roller 7. Each of FIGS. 4 and 5 shows the absolute magnitude of the thrust stress in N/mm$^2$ over the contact width of the belt 2 on the support roller 7 as indicated by length co-ordinates in mm. In FIG. 4 A denotes the typical thrust stress pattern when passing over an intact support roller 7. The configuration involved is a sinusoidal curve which passes through the origin of the co-ordinate system. The amplitude of the curve or the magnitude of the thrust stress changes when the load conditions of the belt are different. In other words, the load state of the belt can be recognised by reference to the absolute level of the thrust stress. In contrast, the signal pattern or configuration allows conclusions to be drawn about how the rotary speed of the support roller 7 is in relation to the speed of movement of the belt 2.

The curve identified by A' in FIG. 4 shows the typical signal configuration in the case of a braked support roller 7, which for example is in a condition of being braked by virtue of a bearing defect. Separate detection of the load state of the belt is not required as the applied load for the sensor which is fixed with respect to the belt remains the same during half a revolution and it is only the relative value between different support rollers that is required in order to discover any anomalies.

Reference will now be made to FIG. 5 illustrating different thrust stress patterns for differing heightwise orientations of the support roller frame structures 7 which are arranged in succession in the longitudinal direction in a belt conveyor. The signal configuration B shows the thrust stress variation over the middle one of three support rollers 7 arranged in succession in the direction of conveying movement, wherein the support roller is correctly oriented in relation to the adjacent support rollers. The signal B' in contrast shows the thrust stress variation over the support roller in question if that support roller is arranged about 200 mm higher than the respectively adjacent support rollers.

It will be appreciated that the above-described embodiment of the method and the apparatus in accordance with the present invention has been described hereinbefore solely by way of example and illustration of the principles of the invention and that various modifications and alterations may be made therein without thereby departing from the spirit and scope of the invention.

What is claimed is:

1. A method of monitoring at least one of the parameters consisting of belt orientation and belt travel of a band belt conveyor apparatus, including the following method steps:

a) measuring at least one of the parameters consisting of compression and thrust stress variation within the belt when passing over a support roller arrangement, b) recording a signal produced by said measurement and associating the signal with a respective given support roller arrangement, the association of a measurement signal with a respective support roller arrangement being effected with calculation of the number and the time spacings of characteristic measurement signals relative to each other having regard to the speed of the belt band, wherein measurement and recording of the signal is effected without the assistance of travel sensors, and c) displaying the signal provided with the positional association for the purposes of detecting at least one phenomenon from the group consisting of misalignment of the belt and defects at the at least one support roller in question.

2. A method as set forth in claim 1 wherein said detected measurement values are continuously read out during operation of the belt conveyor apparatus.

3. A method as set forth in claim 1 and further including the step of recording the quantitative variation in a thrust stress signal measured in the belt over the variation in respect of time of the signal when traveling over a support roller arrangement, and using the recorded signal with its positional identification to assess at least one of the parameters belt travel and belt orientation at the location in question.

4. A method as set forth in claim 1 wherein thrust stress measurement is effected in first and second mutually perpendicular axes.

5. A method as set forth in claim 4 wherein thrust stress measurement is effected in the direction of belt travel and in transverse relationship with the direction of belt travel.

6. A method as set forth in claim 1 and further including the steps of storing the detected measurement values in an intermediate storage means, and cyclically outputting said detected measurement values.

7. A method as set forth in claim 1 and further including the steps of storing the detected measurement values in an intermediate storage means, and cyclically reading out said detected measurement values.

8. A method as set forth in claim 7 wherein said detected measurement values are contactlessly read out.

9. A band belt conveyor apparatus for bulk material comprising;

a plurality of stations, at least one flexible band belt which in operation passes through said stations thereby forming a load run and an idle run, support roller means between the stations for at least partially supporting the belt, at least one measuring means embedded in the belt for detecting at least one of the parameters consisting of compression and thrust stresses in the belt when said belt passes over said support roller means, said measuring means including at least one multi-axis sensor for detecting at least one of said stress parameters, and means for at least one of the actions consisting of outputting and storing the detected measurement values.

10. A conveyor apparatus as set forth in claim 9 wherein the belt comprises rubber-elastic material with tensile carriers vulcanised thereinto and wherein the measuring means are vulcanised into the belt.

11. A conveyor apparatus as set forth in claim 10 including on each of first and second sides of the tensile carriers in the belt a respective plurality of measuring means arranged in distributed relationship in accordance with the number of support rollers over the width of the belt.

12. A conveyor apparatus as set forth in claim 9 wherein the measuring means includes means for at least one of the actions of evaluation and storage of the measurement values.

13. A conveyor apparatus as set forth in claim 9 wherein said means for outputting measurement values include at least one transmitter embedded in the belt band.

14. A conveyor apparatus as set forth in claim 9 wherein said means for outputting measurement values include at least one transponder embedded in the belt band.

* * * * *